US009645805B2

(12) United States Patent
Govindaraju et al.

(10) Patent No.: US 9,645,805 B2
(45) Date of Patent: May 9, 2017

(54) APPLICATION BLUEPRINTS BASED ON SERVICE TEMPLATES TO DEPLOY APPLICATIONS IN DIFFERENT CLOUD ENVIRONMENTS

(71) Applicant: VMWARE, INC., Palo Alto, CA (US)

(72) Inventors: Agila Govindaraju, Bangalore (IN); Kiran Singh, Bangalore (IN); Ashish Kumar Jain, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/453,668

(22) Filed: Aug. 7, 2014

(65) Prior Publication Data
US 2015/0378703 A1 Dec. 31, 2015

(30) Foreign Application Priority Data
Jun. 26, 2014 (IN) .......................... 3119/CHE/2014

(51) Int. Cl.
G06F 9/44 (2006.01)
G06F 9/445 (2006.01)
G06F 9/50 (2006.01)

(52) U.S. Cl.
CPC .................. *G06F 8/60* (2013.01); *G06F 9/50* (2013.01); *G06F 8/20* (2013.01)

(58) Field of Classification Search
None
See application file for complete search history.

(56) References Cited

U.S. PATENT DOCUMENTS

| | | | |
|---|---|---|---|
| 7,822,826 B1 * | 10/2010 | Savchenko | G06F 8/61 709/217 |
| 9,015,712 B1 * | 4/2015 | Hodge et al. | 718/1 |
| 2007/0201655 A1 * | 8/2007 | Shenfield | G06F 8/61 379/201.01 |
| 2011/0029882 A1 * | 2/2011 | Jaisinghani | 715/736 |
| 2011/0126207 A1 * | 5/2011 | Wipfel et al. | 718/104 |
| 2011/0145790 A1 * | 6/2011 | Rajaraman et al. | 717/124 |
| 2011/0209140 A1 * | 8/2011 | Scheidel et al. | 717/172 |
| 2012/0084406 A1 * | 4/2012 | Kumbalimutt | 709/220 |
| 2012/0260229 A1 * | 10/2012 | Peraza et al. | 717/105 |
| 2012/0266156 A1 * | 10/2012 | Spivak | G06F 9/5055 717/172 |
| 2013/0232463 A1 * | 9/2013 | Nagaraja et al. | 717/101 |
| 2013/0232480 A1 * | 9/2013 | Winterfeldt et al. | 717/177 |
| 2013/0232497 A1 * | 9/2013 | Jalagam et al. | 718/104 |
| 2013/0232498 A1 * | 9/2013 | Mangtani et al. | 718/104 |
| 2013/0238805 A1 * | 9/2013 | Catrein et al. | 709/226 |

(Continued)

*Primary Examiner* — Isaac T Tecklu

(57) ABSTRACT

Disclosed examples to configure an application blueprint involve, during a design phase, binding a service template to a node of the application blueprint. The application blueprint defines an application to be deployed in a cloud environment. The service template is mapped to a plurality of services that are selectable during a runtime phase to implement the node in the cloud environment. During the runtime phase, a first one of the services is bound to the node of the application blueprint based on the first one of the services being mapped to the service template and being selected during the runtime phase. An application deployment profile is generated based on the binding of the first one of the services to the node.

21 Claims, 10 Drawing Sheets

(56) References Cited

U.S. PATENT DOCUMENTS

| | | | |
|---|---|---|---|
| 2013/0239089 A1* | 9/2013 | Eksten | G06F 8/70 717/120 |
| 2013/0263080 A1* | 10/2013 | Karnik et al. | 717/104 |
| 2013/0263091 A1* | 10/2013 | Neogi | 717/126 |
| 2013/0311645 A1* | 11/2013 | Nagami et al. | 709/224 |
| 2014/0019597 A1* | 1/2014 | Nath et al. | 709/220 |
| 2014/0075032 A1* | 3/2014 | Vasudevan et al. | 709/226 |
| 2014/0143422 A1* | 5/2014 | Joseph et al. | 709/226 |
| 2014/0181816 A1* | 6/2014 | Muller et al. | 718/1 |
| 2014/0282457 A1* | 9/2014 | Chow | G06F 8/54 717/164 |
| 2014/0283031 A1* | 9/2014 | Eksten | G06F 21/105 726/22 |
| 2014/0344323 A1* | 11/2014 | Pelavin et al. | 709/201 |
| 2014/0380308 A1* | 12/2014 | Hassine et al. | 718/1 |
| 2015/0057078 A1* | 2/2015 | Moore et al. | 463/29 |

* cited by examiner

BLUEPRINT EDITOR GRAPHICAL USER INTERFACE

| LOAD BALANCER SERVICE TEMPLATE – CONFIGURATION PROPERTIES ||||||||
|---|---|---|---|---|---|---|---|
| DETAILS | PROPERTIES | ACTIONS ||||||
| | Property Name | Description | Type | Catalog Value | Value | Required | Secured | Overridable |
| | http_node_port | HTTP port number | String | ["None"] | all(appserver. PORT_NUMBER) | | | |
| | http_proxy_port | HTTP proxy port number | String | 8081 | use catalog value | X | | X |
| | http_node_ips | Array of IPs to proxy. Set to ["None"] to disable proxy. | Array | ["None"] | all(appserver.ip) | X | | |
| | appsrv_routes | Application server route configuration to apply sticky sessions | Array | ["None"] | all(appserver.dBossApp Server.JVM_ROUTE) | X | | |
| | http_port | HTTP port | String | ["None"] | use catalog value | | | |

400

TEMPLATE PROPERTIES DEFINITIONS
GRAPHICAL USER INTERFACE

FIG. 4

SERVICE TEMPLATE BINDING
GRAPHICAL USER INTERFACE

APPLICATION BLUEPRINTS BASED ON SERVICE TEMPLATES TO DEPLOY APPLICATIONS IN DIFFERENT CLOUD ENVIRONMENTS

RELATED APPLICATIONS

Benefit is claimed under 35 U.S.C. 119(a)-(d) to Foreign application Serial No. 3119/CHE/2014 filed in India entitled "APPLICATION BLUEPRINTS BASED ON SERVICE TEMPLATES TO DEPLOY APPLICATIONS IN DIFFERENT CLOUD ENVIRONMENTS", filed on Jun. 26, 2014, by VMware, Inc., which is herein incorporated in its entirety by reference for all purposes.

FIELD OF THE DISCLOSURE

The present disclosure relates generally to cloud computing and, more particularly, to designing application blueprints based on service templates to deploy applications in different cloud environments.

BACKGROUND

In cloud computing design, numerous tools exist to create and deploy applications in cloud environments. For example, application provisioning tools facilitate cloud computing designers to create and standardize application deployment topologies on infrastructure clouds. Some application provisioning tools include graphical user interfaces (GUIs) that enable designers to generate application deployment topologies called application blueprints, which define structures and configurations of applications. Once a blueprint is designed to define an application, the blueprint can be used to deploy multiple instances of the application to many cloud environments.

A blueprint binds nodes of an application to particular services. Instances of the application will be deployed based on the service bindings defined in the blueprint. When a different service is desired for an instance of the application, a new blueprint is defined to bind the desired different service to a corresponding node of the application. In this manner, two different blueprints can be defined so that separate instances of an application can be deployed using different sew ices for the two blueprints.

BRIEF DESCRIPTION OF THE DRAWINGS

FIG. 4 depicts another example graphical user interface of the blueprint editor 4 of FIG. 1 to define configuration properties of service templates.

DETAILED DESCRIPTION

Figure 1:
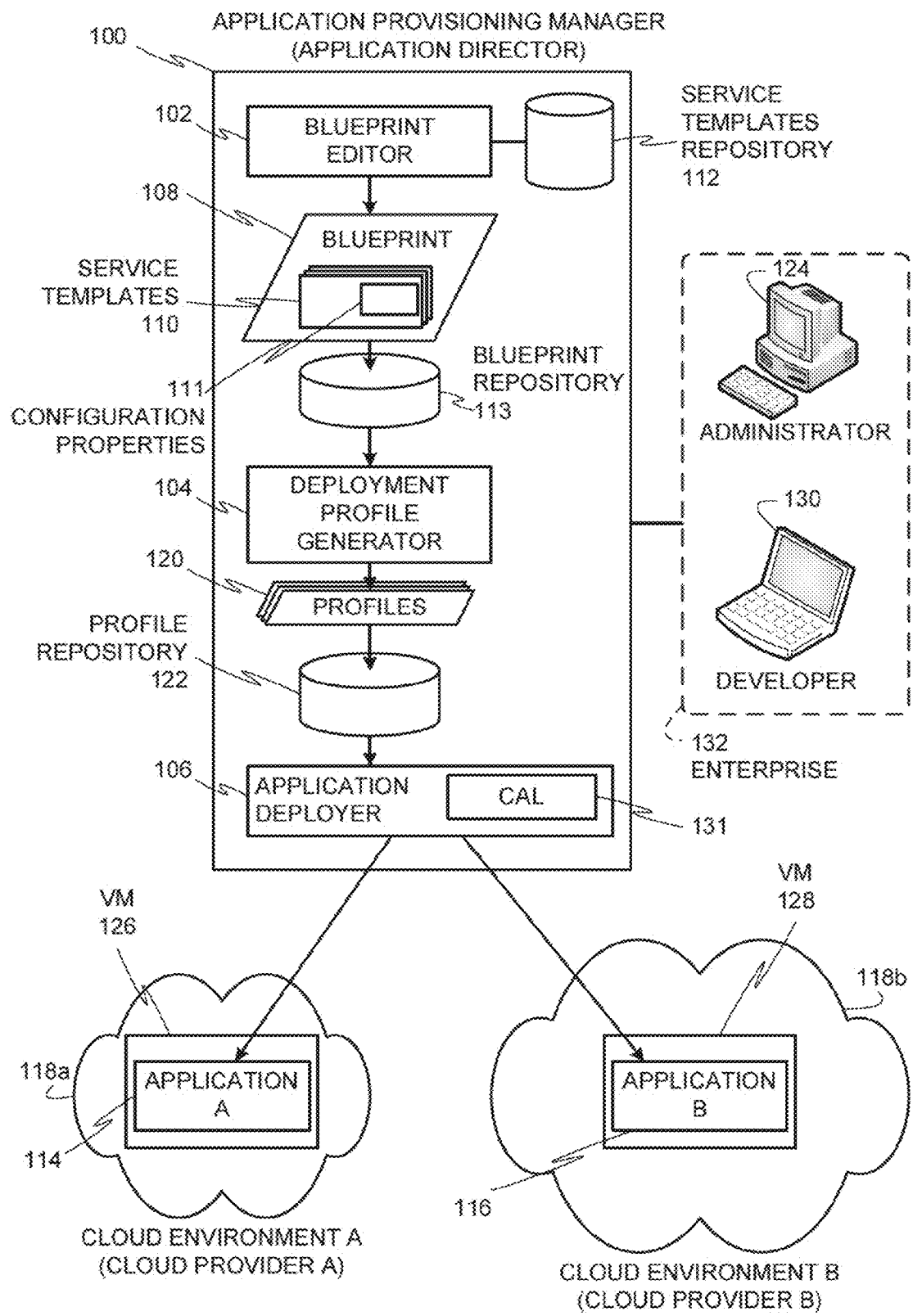
FIG. 1 depicts an example application provisioning manager to generate application blueprints that define applications based on service templates to facilitate binding different services to different instances of an application deployed based on the same application blueprint.

Prior application provisioning managers enable designing applications by dragging and dropping different components of an application onto an application blueprint (e.g., a blueprint) in a graphical user interface (GUI) of a blueprint editor. In this manner, designers of cloud-deployable applications can create blueprints that can be subsequently used numerous times to deploy instances of the same application in numerous deployment environments. That is, a blueprint designed Using such a prior application provisioning manager can be used to deploy a first instance of an application in a first physical cloud environment, and deploy a second instance of the application in a second physical cloud environment. However, such prior application provisioning managers generate blueprints by fixedly binding nodes of an application to particular services such that a blueprint is useful to deploy applications based only on the services that were hound to the application at a design phase of the blueprint. Such prior application provisioning managers do not allow configuring blueprints (e.g., at the time the blueprints are initially designed) so that services used to deploy an application can be changed without re-designing the blueprint or creating a new blueprint defining bindings of different services for the application. That is using prior application provisioning managers, when one or more different services are desired for an instance of an application, a new blueprint is defined to bind the desired different service(s) to a corresponding node or nodes of the application. As such, two different blueprints must be defined so that separate instances of an application can be deployed using services that are different between the two blueprints.

Examples disclosed herein enable configuring a blueprint to define an application using service templates so that the actual service used to deploy an application in a cloud environment can be selected or changed at run-time based on, for example, the cloud environment in which the application will be deployed. In this manner, a blueprint can be flexibly configured once (e.g., one initial configuration) without fixedly binding the blueprint to particular services so that the blueprint can subsequently be used numerous times to deploy different instances application bayed on services selected at run-time for the same blueprint. In examples disclosed herein, such flexibility to enable selecting different services for different applications that are deployed based on the same blueprint is achieved by binding service templates to nodes that define an application.

Example service templates disclosed herein are configured at a design phase to allow binding any of a number of services to an application at run-time when the application is being deployed. For example, a developer may design a multi-tier clustered application that the developer desires to deploy in a development environment in which the application is to use a particular service (e.g., an Apache load balancer) for a particular node (e.g., a load balancer node) of the application, and may desire to deploy another instance of the same application in a production environment in which the application is to use a different service (e.g., an F5 load balancer from F5 Networks, Inc.) for the same node (e.g., the load balancer node) of the application. Using prior application provisioning managers to achieve such different deployments using different services, the developer would need to create two different blueprints to define the two applications so that one blueprint is fixedly bound to the Apache service for deploying the load balancer node of one application and so that the other blueprint is fixedly bound to the F5 service for deploying the load balancer node of the other application. Designing separate blueprints in this manner to achieve application deployments using different services often introduces doubt as to whether a blueprint designed to deploy an application in a production deployment can be trusted to function in the same manner as a blueprint used to develop the application in a development environment. That is, although an application is developed and tested to satisfaction in a development environment based on one blueprint, subsequently designing a separate blueprint to deploy the developed application in a production environment creates a situation in Which the new blueprint for production provides little or no assurance of how it will perform to deploy the application in a production environment. That is the blueprint used to develop the application in a development environment is used and tested numerous times during development, while the newly designed blueprint for production may not have such an arduously tested history.

Unlike prior techniques that require developing two or more separate blueprints to deploy applications using different services, examples disclosed herein use service templates to develop blueprints at a design phase so that a same blueprint can be used to deploy different instances of an application using different services selected at run-time when the applications are being deployed. In some examples, techniques disclosed herein are useful for using a blueprint at a design phase to develop and test an application based on particular services in a development cloud environment and subsequently using the same tested and approved blueprint at runtime to deploy the application based on one or more different services in a production cloud environment. Such use of a single blueprint to deploy in different cloud environments using one or more different services provides numerous advantages over prior techniques. An example advantage is that a blueprint that is tested and approved in a development cloud environment can be used to deploy an application in a production cloud environment with assurances of how the blueprint will operate when deploying the application since it has been previously used and tested a numerous times during development. Another example advantage is that developers do not have to develop, update, maintain, and test multiple separate blueprints for numerous applications that differ in the types of services bound to each application. Such updating and maintaining of separate blueprints can be tedious time consuming, and error prone because a developer must be certain that all aspects that are common to the blueprints are updated in the same manner across all blueprints. In addition, the developer must test all of the blueprints when any change is made to the common aspects. Using examples disclosed herein to develop blueprints using service templates that allow binding different services to different aspects of an application at runtime allow a developer to develop, update, maintain, and test a single blueprint, thereby reducing time, resources, and possibilities of errors when developing, deploying, and maintaining applications.

Examples disclosed herein may be used to configure application blueprints using service templates. Examples disclosed herein involve during a design phase, binding a service template to a node of the application blueprint. In examples disclosed herein, the application blueprint defines an application to be deployed in a cloud environment. In examples disclosed herein, the service template is mapped to a plurality of services that are selectable during a runtime phase to implement the node in the cloud environment. In examples disclosed herein, a first one of the services is hound to the node of the application blueprint during the runtime phase based on the first one of the services being mapped to the service template and being selected during the runtime phase. In examples disclosed herein, an application deployment profile is generated during the runtime phase based on the binding of the first one of the services to the node.

In some examples disclosed herein, the first one of the services is mapped to the service template prior to the design phase. In some such examples, the mapping of the first one of the services to the service template prior to the design phase is indicative of the first one of the services being selectable during the runtime phase for binding to the node associated with the service template.

In some examples disclosed herein, configuration properties are associated with the deployment profile. In some such examples, the configuration properties include dependency properties to configure inter-node dependencies between the node and other nodes of the application blueprint.

In some examples disclosed herein, the application is deployed in a cloud environment based on configuring a virtual machine to host the application using configuration properties associated with the service template.

In some examples disclosed herein, the application blueprint is stored during the design phase, and the application blueprint is used one or more times during a runtime phase. For example, the application blueprint is used during the runtime phase to generate a first deployment profile to deploy a first application using a first service selected based on the service template to implement the node, and to generate a second deployment profile to deploy a second application using a second service based on the service template to implement the node. In some such examples, the second service is different from the first service.

In some examples disclosed herein, the service template is preconfigured prior to the design phase to include dependency properties defining inter-node dependencies between the node and other nodes.

In some examples disclosed herein, the service template is preconfigured prior to the design phase to include values of properties that are configured to be the same for the plurality of the services that are selectable during the runtime phase to implement the node in the cloud environment.

FIG. 1 depicts an example application provisioning manager 100 (e.g., an application director) to generate application blueprints (e.g., blueprints) using service templates to use a same blueprint to deploy different instances of an application using services that are different between the instances of the application. The different instances of the application can be deployed across multiple deployment environ eats (e.g., different deployment environments of the same cloud provider or of different cloud providers). In the illustrated example, the example application provisioning manager 100 includes an example blueprint editor 102, an example deployment profile generator 104, and an example application deployed 106. The example blueprint editor 102 is provided to receive user inputs and generate an example application blueprint 108 (e.g., a user-designed application blueprint) that is based on a user-specified configuration that binds nodes (e.g., example nodes 502, 504, 506 of FIG. 5) of an application to service templates 110.

The example service templates 110 are data structures that store configuration information to abstract services at the blueprint level so that a developer (e.g., a developer 130 of FIG. 1) does not need to bind particular services to the application blueprint 108 at a design phase. Instead, the application blueprint 108 can be flexibly designed at the design phase so that particular services for applications can be selected, bound, and configured for deployment at runtime. For example, a service template 110 is a placeholder for an actual service. The example service template 110 can be assigned or bound to a node of an application at the design phase so that any of a number of particular services can be selected and bound at runtime when the application is to be deployed. That is, instead of specifying a particular service for a particular node in the application blueprint 108 at the design phase, the example service template 110 an be selected via the blueprint editor 102 to represent a service (or a service placeholder) at an abstract level for the particular node.

Although services are represented at an abstract level by example service templates 110 to provide flexibility in later selecting particular services for corresponding nodes of the example application blueprint 108 at runtime, the service templates 110 expose configuration properties 111 that include dependency properties and common attributes. In examples disclosed herein, dependency properties define dependencies between nodes (e.g., inter-node dependencies) of an application. For example, communications, control, or information processing at one node may depend on information or activities at another node. In examples disclosed herein, common attributes or properties are properties that are generally applicable to all services that may be selected for a particular template and configurable to be the same across those services (e.g., properties generally applicable to any load balancer service that may be selected for a load balancer template, properties generally applicable to any application server service that may be selected for an application server service template, properties generally applicable to any database service that may be selected for a database service template, etc.). In examples disclosed herein, the configuration information 111 is information to configure virtual machines (e.g., the VMs 126 and 128 of FIG. 1) to host corresponding nodes of an application. By snaking the configuration properties 111 accessible from the example service templates 110, a developer can define inter-node dependencies at a design phase to establish dependencies between nodes of the application blueprint 108 and so that the developer can configure as many common attributes as possible at the design phase (e.g., can define dependencies and configure common attributes that are applicable to any particular service that may be selected at runtime). In this manner, when particular services are selected at runtime, much of the configuration to bind the particular services to their corresponding nodes of an application is already complete. By configuring the example service templates 110 to provide access to the configuration properties 111, the service templates 110 can be used to configure valid application blueprint 108 at the design phase that can be used to deploy numerous applications at runtime using different services across the deployed applications. In the illustrated example, some of the service templates 110 are multi-tier service templates because they enable designing multi-tier applications including multiple nodes and dependencies between the nodes. In the illustrated example, the application provisioning manager 100 is provided with an example service templates repository 112 to store service templates such as the service templates 110 of the illustrated example. The example service templates repository 112 may be implemented using any suitable memory (e.g., random access memory 1014 of FIG. 10, local memory 1013 of FIG. 10, mass storage memory 1028 of FIG. 10, etc.) to store computer readable data. In some examples, the service templates repository 112 is separate from the application provisioning manager 100.

Applications (e.g., applications 114, 116) are typically developed using multi-tier architectures in which functions such as presentation, application processing, and data management are logically separate components. For example, an enterprise's custom banking application that has a multi-tier architecture may use a cluster of application servers (e.g., Moss Application Servers) to execute in a scalable runtime environment, a relational database management system (e.g., MySQL) to store account data, and a load balancer to distribute network traffic for robustness. To deploy such a multi-tier application, a developer, who understands the architecture of the application, must coordinate with a system administrator, who controls access to computing resources, to determine which computing resources (e.g., computing, networking, and storage) and software services (e.g., software packages) should be provisioned to support execution of the application.

Blueprints, such as the example application blueprint 108, define the structure of an application, enable the use of standardized application infrastructure components, and sp installation dependencies (e.g. dependencies between different nodes of an application) and default configurations. Blueprints define the topology for deployment in an infrastructure-agnostic manner to be portable across different cloud computing environments. The application blueprint 108 of the illustrates example may be assembled out of items from a catalog not shown), which is a listing of available virtual computing resources (e.g., virtual machines (VMs), networking, storage, etc.) that may be provisioned by cloud computing platform providers (e.g., one or more cloud providers of the cloud environments 118a, 118b) and available application components (e.g., software services, scripts, code components, application-specific packages) that may be installed on the provisioned virtual computing resources. An administrator 124 (e.g., IT or system administrator) may pre-populate and customize a catalog by entering specifications, configurations, properties, and other details about each item in the catalog. The application blueprint 108 may define one or more dependencies between application components to indicate an installation order of the application components during deployment. For example, since a load balancer node of an application usually cannot be configured until a web application is up and running, the application blueprint 108 dray specify a dependency from an Apache service (used to implement the load balancer node of the application) to a web application code package.

In examples disclosed herein, during a design phase, the application provisioning manager 100 of the illustrated example enables the example blueprint editor 102 to provide a set of service templates (e.g., the service templates 110) stored in the service templates repository 112 for different services (e.g., a load balancer service, an application server service, a database service, etc.). In the illustrated example, the application blueprint 108 that is based on the service templates 110 is useable to select different particular services for different instances of an application so that, for example, the application blueprint 108 is useable to deploy different instances of an application shown as application A 114 and application B 116 in FIG. 1 across the same or different cloud environments (e.g., one or more deployment environments of the same or different cloud providers) shown as example cloud environment A 118a and example cloud environment B 118b. To store application blueprints 108 generated at a design phase so that the blueprints 108 can be used during a runtime phase, the application provisioning, manager 100 is provided with an example blueprint repository 113. The example blueprint repository 113 may be implemented using any suitable memory (e.g., the random access memory 1014 of FIG. 10, the local memory 1013 of FIG. 10, the mass storage memory 1028 of FIG. 10, etc.) to store computer readable data. In some examples, the example blueprint repository 113 is separate from the application provisioning manager 100.

The example deployment profile generator 104 of FIG. 1 is provided to generate example deployment profiles 120 (e.g., an application deployment profile) based on the example application blueprint 108 and the service templates 110 bound to the application blueprint 108. In some examples, a same deployment profile 120 is configured based on the application blueprint 108 to deploy both of the applications 114, 116 if both of the applications 114, 116 use the same services. In some examples, different deployment profiles 120 are configured based on the same application blueprint 108 to deploy the applications 114, 116 using different services for each of the example applications 114, 116. That is, one of the deployment profiles 120 is used to bind one service (e.g., an Apache load balancer service) to a node (e.g., a load balancer node) for use with the application 114, and another deployment profile 120 is used to bind a different service (e.g., an F5 load balancer service) to the same node (e.g., the load balancer node) for use with the application 116.

In the illustrated example, the application provisioning manager 100 is also provided with an example profile repository 122 to store deployment profiles such as the example deployment profiles 120 for subsequent use at deployment true to deploy, for example, the applications 114, 116. The example profile repository 122 may be implemented using any suitable memory (e.g., the random access memory 1014 of FIG. 10, the local memory 1013 of FIG. 10, the mass storage memory 1028 of FIG. 10, etc.) to store computer readable data. Its some examples, the profile repository 122 is separate from the application provisioning manager 100.

At runtime, when a deployment profile 120 is created to deploy a corresponding one of the applications 114, 116 in one of the cloud environments 118a, 118b the service templates 110 used to design the application blueprint 108 can be mapped to a particular service. The mapped service will be associated with dependency properties (e.g., inter-node dependencies) defined in the application blueprint 108 at a design phase. In the illustrated example, the deployment profile 120 is used to assign values at runtime to the dependency properties defined in the application blueprint 108 so that inter-node dependencies between nodes of the application 114, 116 are valid so that the application 114, 116 is deployed to operate as intended (e.g., deployed in a manner that satisfies dependencies).

In the illustrated example, the example deployment profiles 120 are data structures generated using the example application blueprint 108 and store configuration information to deploy applications based on particular sets ices selected to ii implement nodes of the application blueprint 108. In some examples, the example deployment profiles 120 are distributed as local deployment plans having a series of tasks to be executed by virtual machines (VMs) (e.g., VMs 126 and 128) provisioned in different cloud computing environments (e.g., the cloud environments 118a, 118b). Each VM 126, 128 of the illustrated example coordinates execution of each task with a centralized deployment module to ensure that tasks are executed in an order that complies with inter-node dependencies specified in the example application blueprint 108. In the illustrated example of FIG. 1, the application A 114 runs on an example VM 126 in the deployment environment A 118a, and the application B 116 runs on an example VM 128 in the deployment environment B 118b. In the illustrated example, the VM 126 is configured based on one of the deployment profiles 120 to deploy the application 114 and the VM 128 is configured based on another one of the deployment profiles 120 to deploy the application 116 so that one or more services can be different between the applications 114, 116.

The example application deployer 106 is provided to define network configuration details for the example deployment profile 120 at deployment time. For example, when the developer 130 is ready to deploy the applications 114, 116 in the deployment environments 118a, 118b, the developer 130 can define network mapping details for the cloud environments 118a, 118b to configure the VMs 126, 128. For example, the VM 126 is configured to host the application 114, and the VM 128 is configured to host the applications 116. For example, the example application deployer 106 is provided with an example cloud abstraction layer (CAL) module 131 that communicates network mapping details and configuration information to target cloud providers (e.g., cloud providers of the deployment environments 118a, 118b) to provision the VMs 126, 128 that are to host the applications 114, 116.

The example application provisioning manager 100 (an application director) may be running in one or more VMs acid may be used by the developer 130 of an enterprise 132 to generate the example application blueprint 108 based on the example service templates 110 and to generate the ex ample deployment profiles 120 based on the example application blueprint 108 to configure and deploy the applications 114, 116 in the deployment environments 118a, 118b. For example, the developer 130 may interact with the blueprint editor 102 to create the application blueprint 108, may interact with the deployment profile generator 104 to create the deployment profiles 120, and may interact with the application deployer 106 to define network configuration details to deploy the applications 114, 116.

While an example manner of implementing the applications provisioning manager 100 is illustrated in FIG. 1, one or more of the elements, processes and/or devices illustrated in FIG. 1 may be combined, divided, re-arranged, omitted, eliminated anchor implemented in any other way. Further, the example blueprint editor 102, the example deployment profile generator 104, the example application deployer 106, the example CAL module 131 and/or, more generally, the example application provisioning manager 100 of FIG. 1 may be implemented by hardware, software, firmware and/or any combination of hardware, software and/or firmware. Thus, for example, any of the example blueprint editor 102, the example deployment profile generator 104, the example application deployer 106, the example CAL module 131 and/or, more generally, the example application provisioning manager 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example blueprint editor 102, the example deployment profile generator 104, the example application deployer 106, and/or the example CAL module 131 is/are hereby expressly defined to include a tangible computer readable storage device or storage disk such as a memory, a digital versatile disk (DVD) a compact disk (CD), A Blu-ray disk, etc, storing the software and/or firmware. Further still, the example application provisioning manager 100 of FIG. 1 may include one or more elements, processes and/or devices in addition to, or instead of, those illustrated in FIG. 1, and/or may include more than one of any or all of the illustrated elements, processes and devices.

Figure 2:
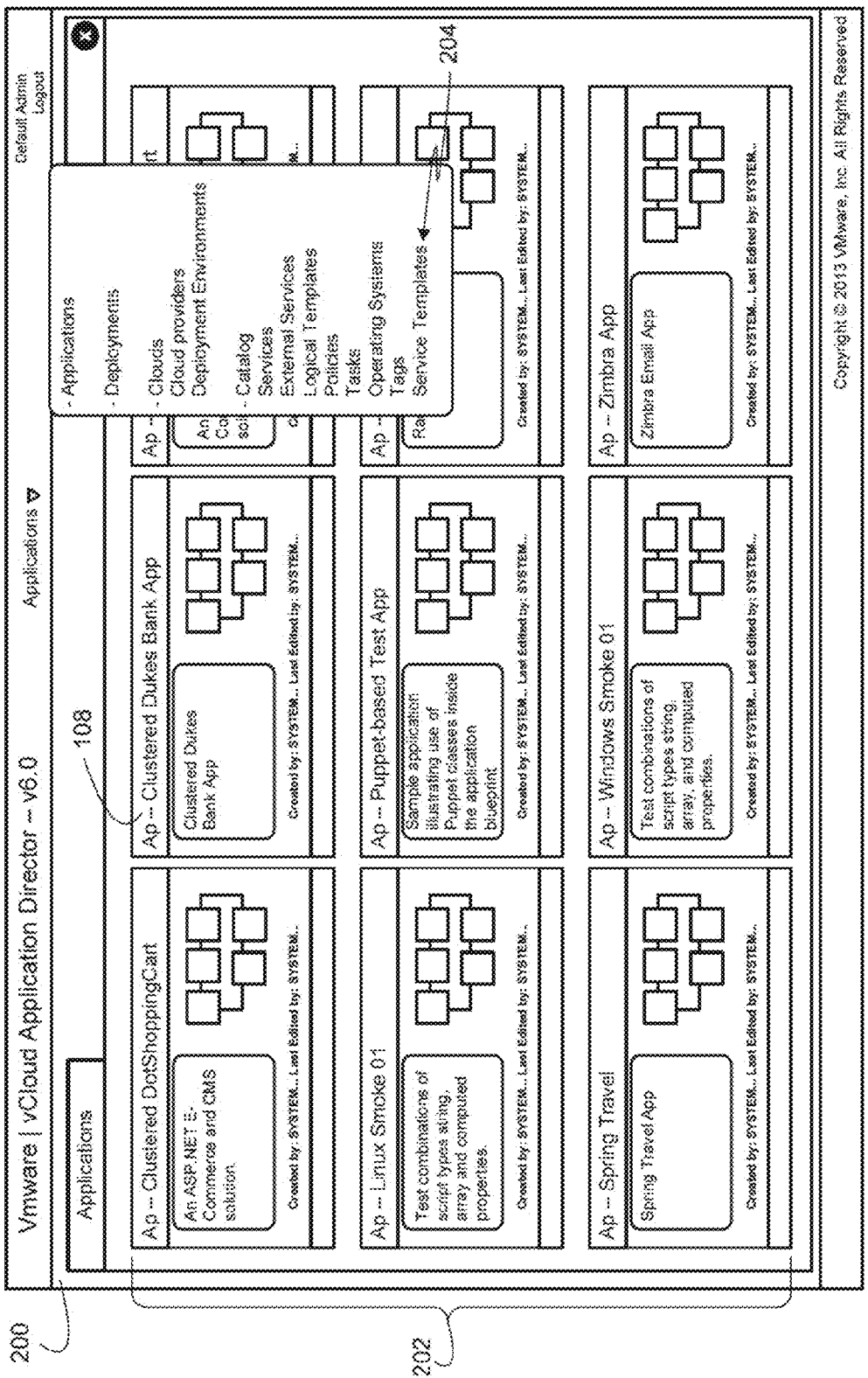
FIG. 2 depicts an example graphical user interface of blueprint editor of FIG. 1 to design application blueprints based on service templates.

FIG. 2 depicts an example blueprint editor graphical user interface (GUI) 200 of the example blueprint editor 102 of FIG. 1. The example blueprint editor GUI 200 is provided to the example blueprint editor 102 to enable users (e.g., the developer 130 of FIG. 1) to design application blueprints (e.g., the application blueprint 108 of FIG. 1) based on service templates (e.g., the service templates 110 of FIG. 1). In the illustrated example, the blueprint editor GUI 200 shows a plurality of application blueprints 202, including the application blueprint 108 of FIG. 1. In the illustrated example, to enable a catalog administrator (e.g., the administrator 124 of FIG. 1) to design service templates (e.g., the service templates 110 of FIG. 1), the blueprint editor GUI 200 is provided with a user-selectable 'Service Templates' GUI control 204 (e.g., shown as a user-selectable option in a drop-down menu) that is displayed for user selection. When the example blueprint editor 102 detects a user-selection of the example 'Service Templates' GUI control 204, the blueprint editor 102 presents graphical user interfaces as described below in connection with FIGS. 3 and 4 to enable the administrator 124 to design service templates (e.g., the service templates 110 of FIG. 1) that a developer (e.g., the developer 130 of FIG. 1) can subsequently use to design application blueprints 202.

Figure 3:
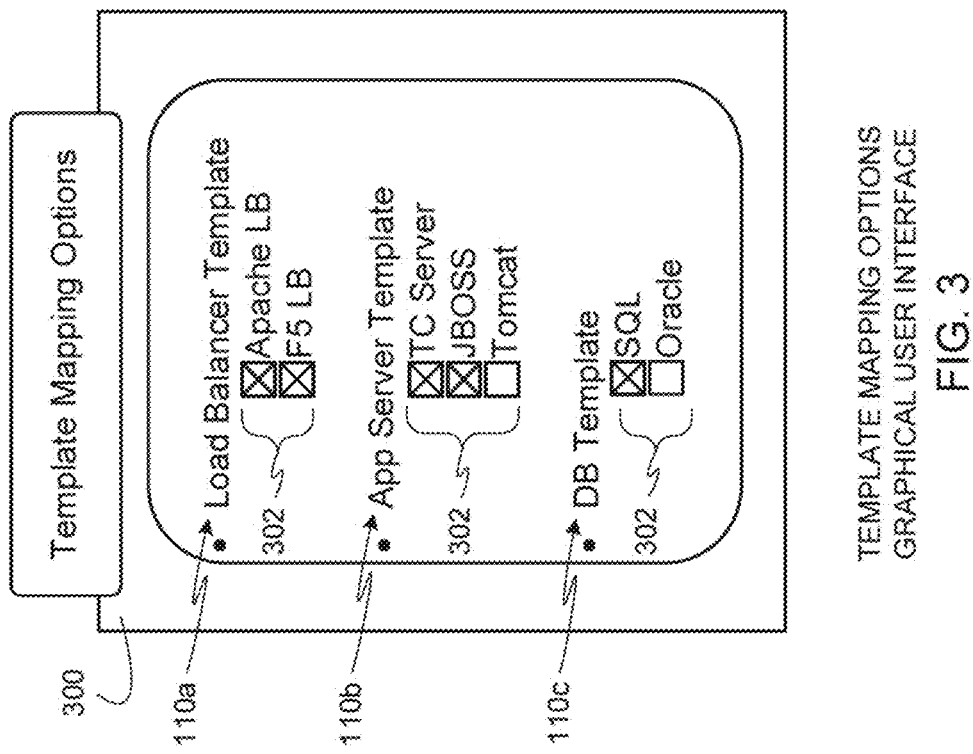
FIG. 3 depicts another example graphical user interface of the blueprint editor of FIG. 1 to select template mapping options to map services to service templates for use in designing application blueprints.

FIG. 3 depicts an example template mapping options GUI 300 of the blueprint editor 102 of FIG. 1 to select template mapping options to Wrap services to service templates (e.g., the service templates 110 of FIG. 1) for use in designing application blueprints (e.g., the application blueprints 108 of FIG. 1). The example template mapping options GUI 300 is presented by the blueprint editor 102 after detecting a user-selection of the 'Service Templates' GUI control 204 of FIG. 2 to enable a user (the administrator 124 of FIG. 1) to design service templates 110 by mapping the example service templates 110 to services that are selectable at a runtime phase to implement different nodes of an application. For example, the administrator 124 may design a service template 110 that can be subsequently used by the developer 130 (FIG. 1) to design the application 108 (FIG. 1). To design an example service template 110 in the illustrated example, the administrator 124 selects which services to associate with the example service template 110. For example, the administrator 124 may select 1, 2, 3, or any number of services. In this manner, when the developer 130 designs the example application blueprint 108 with the example service template 110, the service template 110 is associated with numerous selectable services that the developer can subsequently select from at runtime to deploy an application 114, 116 (FIG. 1). That is, as discussed above, the service template 110 operates as a placeholder for numerous possible services that are subsequently selectable at runtime based on the service template 110 being bound to a node of the application blueprint 108.

To enable mapping services to service templates 110, the example template mapping options GUI 300 is provided with a listing of the example service templates 110a-c and example user-selectable services 302 that are available for mapping to the service templates 110a-c. In the illustrated example, ones of the user-selectable services 302 are shown as selected for mapping to corresponding ones of the service templates 110a-c. For example, an Apache LB (load balancer) service and an F5 LB service are selected for mapping to an example load balancer template 110a as shown in FIG. 3. Thus, if the load balancer template 110a is used to design an application blueprint, the developer 130 will be able to select the Apache load balancer service or the F5 load balancer service for a corresponding load balancer node (e.g., the load balancer node 502 of FIG. 5) at runtime to deploy an application based on a selected one of the Apache load balancer service or the F5 load balancer service to implement the load balancer node. In the illustrated example, a TS server service and a JBOSS service are, selected for mapping to an application server (app server) template 110b, but a Tomcat service is not selected for mapping. As such, using the app server template 110b to design the example application blueprint 108 enables the developer 130 to select from the TS server service and the MOSS service at runtime to implement an appserver node (e.g., the appserver node 504 of FIG. 5), the Tomcat service will not be selectable to implement the app server node. For each of the example service templates 110a-c shown in FIG. 3 for which the administrator 124 elects to map services, the blueprint editor 102 provides the administrator 124 with the option to configure the configuration properties 111 (FIG. 1) of that service template 110a-c. In the illustrated example, the blueprint editor 102 provides an example GUI 400 of FIG. 4 described below to configure such configuration properties 111.

FIG. 4 depicts an example template properties definitions GUI 400 of the blueprint editor 102 of FIG. 1 to define the configuration properties 111 (FIG. 1) of the service templates 110 (FIGS. 1 and 3). In the illustrated example of FIG. 4, the template properties definitions GUI 400 enables the administrator 124 to configure dependency properties of a service template 110 to define dependencies between nodes (e.g., inter-node dependencies) of an application. The example template properties definitions GUI 400 also enables the administrator 124 to configure common attributes and properties of the example service template 110 that are the same across the different services shown in FIG. 3 as being mapped to the service template 110.

Figure 5:
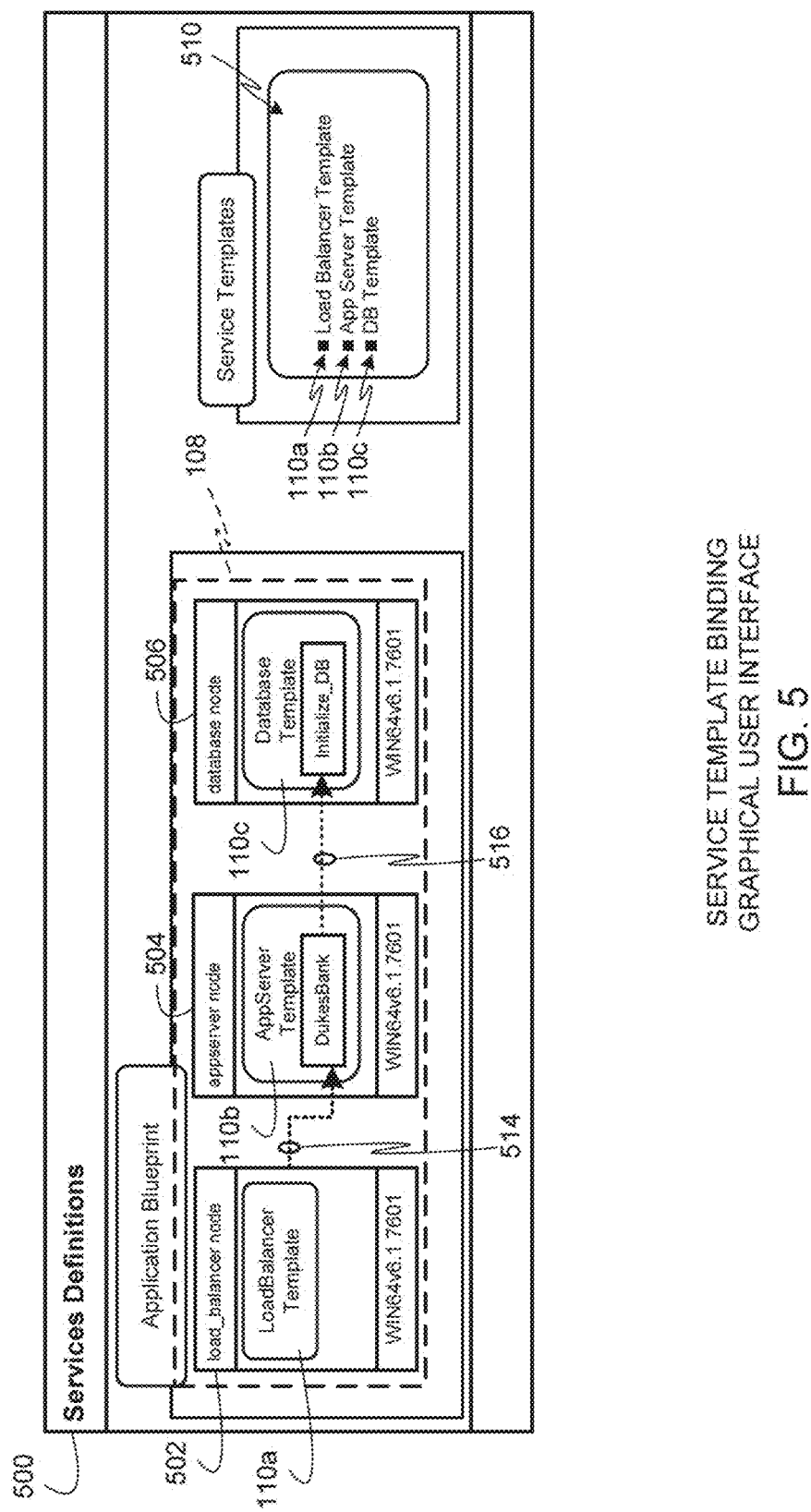
FIG. 5 depicts an example graphical user interface of the blueprint editor of FIG. 1 to bind service templates to nodes in application blueprints.

The example template properties definitions GUI 400 displays configuration properties for the load balancer service template 110a of FIG. 3 so that the administrator 124 can configure common attributes and properties and dependency properties to define dependencies between a load balancer node (e.g., the load balancer node 502 of FIG. 5) and an appserver node (e.g., the appserver node 504 of FIG. 5). In the illustrated example of FIG. 4, the load balancer template includes properties strep as http_node_port configured with a value of all(appserver: PORT_NUMBER), http_node_ips configured with a value of all(appserver.ip), appsrv_routes configured with a value of all(appserver: JBossAppServer: JVM_ROUTE) and other eon ion properties such as http_port/http_proxy_port so that all dependencies between the load balancer node and the appserver node are exposed in the application blueprint 108 when the example load balancer template 110a is used to design the application blueprint 108.

After the load balancer service template properties are defined using the example template properties definitions GUI 400, when a developer 130 subsequently selects, for example, an Apache load balancer service or an F5 load balancer service at runtime for the load balancer service template 110a in the application blueprint 108, the selected one of the Apache load balancer service or the F5 load balancer service will inherit the values of the configuration properties 111 as defined in the example template properties definitions GUI 400. In this manner, the selected one of the Apache load balancer service or the F5 load balancer service can apply the defined configuration properties 111 in its definition and use the configuration properties 111 in its scripts during runtime.

FIG. 5 depicts an example service template binding GUI 500 of the blueprint editor 102 of FIG. 1 to bind service templates 110 (FIGS. 1 and 4) to nodes 502, 504, 506 in the application blueprint 108. The example service template binding GUI 500 displays the example application blueprint 108 including a load balancer node 502, an application server (appserver) node 504, and a database node 506. The example service template binding GUI 500 also displays a service template panel 510 including a user-selectable listing of the load balancer template 110, the app server template 110b, and the database (DB) template 110c. The service template binding GUI 500 of the illustrated example enables designing the application blueprint 108 based on the service templates 110a-c instead of needing to select particular services for the nodes 502, 504, 506 at a design phase. For example, the developer 130 (FIG. 1) can select the load balancer template 110a from the service templates panel 510 to assign the load balancer template 110a to the load balancer node 502. In the illustrated example, the load balancer service template 110a may be dragged and dropped in the load balancer node 502 instead of a particular service. In this manner, instead of needing to assign the particular service (e.g., an Apache load balancer service or an F5 load balancer service) to the load balancer node 502 at the design phase, the service template panel 510 enables flexibly configuring the nodes 502, 504, 506 at the design phase based on the service templates 110a-c so that a number of particular services can be selected for deployment at runtime. This also enables using the sane application blueprint 108 to deploy different applications (e.g., the different applications 114, 116 of FIG. 1) using services that are different between the applications. For example, using the same example application blueprint 108, the example application 114 of FIG. 1 may be deployed using an Apache load balancer service for the example load balancer node 502, and the example application 116 of FIG. 1 may be deployed using an F5 load balancer service for the example load balancer node 502.

The example service template binding GUI 500 of FIG. 5 shows that the blueprint editor 102 hinds the load balancer template 110a to the load balancer node 502, binds the appserver template 110b to the appserver node 504, and binds the database node 506 to the database template 110c. The example service template binding GUI 500 also shows an inter-node dependencies indicator 514 between the load balancer template 110a and the appserver template 110b, and inter-node dependencies indicator 516 between the appserver node 504 and the database node 506. For example, the inter-node dependencies indicator 514 is indicative of dependency properties defined using the template properties definitions GUI 400 of FIG. 4 for the load balancer service template 110a, and the inter-node dependencies indicator 506 is indicative of dependency properties that are also definable using a template properties definitions GUI 400 for the appserver service template 110b.

Figure 6:
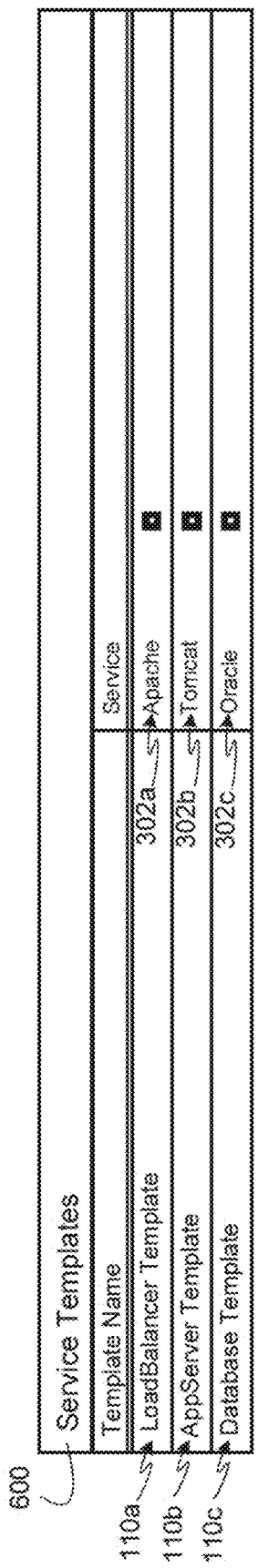
FIG. 6 depicts an example graphical user interface of a deployment profile generator of the application provisioning manager of FIG. 1 to select services at runtime to deploy applications.

FIG. 6 depicts an example deployment profile configuration GUI 600 of the deployment profile generator 104 of the application provisioning manager 100 of FIG. 1 to generate deployment profiles 120 (FIG. 1) by selecting services at runtime for corresponding nodes (e.g., the nodes 502, 504, 506 of FIG. 5) of an application blueprint (e.g., the application blueprint 108 of FIG. 1). The deployment profile generator 104 displays the example deployment profile configuration GUI 600 at a runtime phase during deployment to enable the developer 130 (FIG. 1) to select from different services 302 for each of the service templates 110a-c. For example, for each of the service templates 110a-c, the example deployment profile configuration GUI 600 may display a drop-down list of ones of the services 302 of FIG. 3 mapped to the service templates 110a-c. In this manner, the developer 130 can select a particular service 302 for each service template 110a-c to implement a corresponding node 502, 504, 506 of the application blueprint 108 (FIGS. 1 and 5) to deploy an application (e.g., one of the applications 114, 116 of FIG. 1), In the illustrated example, an Apache load balancer service 302a is selected for the load balancer template 110a, a Tomcat application server service 302b is selected for the appserver template 110b, and a database service 302c is selected for the database template 110c. In some examples, each of the e services 302a-c can also be further edited after they have been selected in the example deployment profile configuration GUI 600. Such further editing may be used to edit the configuration properties 111 of FIG. 1 or other configuration properties and scripts used by the services 302a-c.

The example deployment profile generator 104 uses the example deployment profile configuration GUI 600 of FIG. 6 to enable the developer 130 to generate any number of deployment profiles 120 based on the same application blueprint 108. In this manner, numerous different applications 114, 116 having different services 302 can be deployed based on the same application blueprint 108 by generating different deployment profiles that specify the different services 302. For example, using the same application blueprint 108, the example deployment profile configuration GUI 600 may be used to generate a deployment profile in which the load balancer node 502 (FIG. 5) is implemented using an Apache load balancer service, and to generate another deployment profile in which the load balancer node 502 is implemented using an F5 load balancer service.

Figure 7:
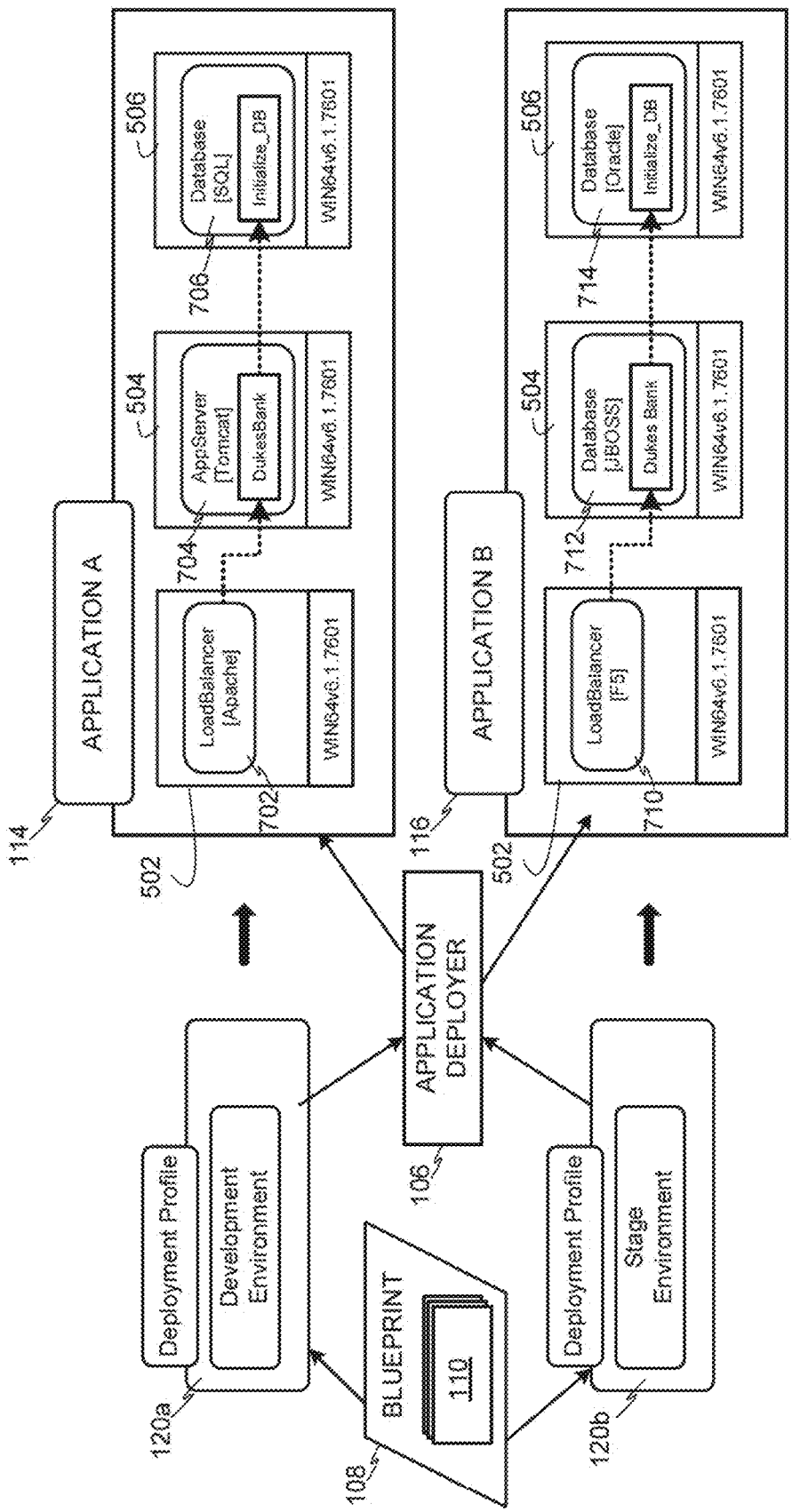
FIG. 7 depicts an example application deployer of FIG. 1 deploying multiple applications based on different application deployment profiles generated using the same application blueprint.

FIG. 7 depicts the example application deployer 106 of FIG. 1 deploying the applications 114, 116 based on different application deployment profiles 120a and 120b generated using the same application blueprint 108. The application deployment profiles 120a and 120b of the illustrated example are generated using the example deployment profile configuration GUI 600 described above in connection with FIG. 6 based on the same application blueprint 108 and service templates 110. As shown in the illustrated example, the application 114 differs from the application 116 in the services selected for the nodes 502, 504, 506 of the applications 114, 116. For example, the load balancer node 502 of the application 114 is implemented using an Apache load balancer service 702, the appserver node 504 of the application 114 is implemented using a Tomcat application server service 704, and the database node 506 of the application 114 is implemented using a SQL database service 706. Different services are selected for the application 116 which includes the load balancer node 502 of the application 116 being implemented using an F5 load balancer service 710, the appserver node 504 of the application 116 being implemented using a MOSS application server service 712, and the database node 506 of the application 116 being implemented using an Oracle service 714. Although only two deployment profiles 120a and 120b are shown in FIG. 7, the example application deployer 106 may be used to deploy any number of deployment profiles 120 generated based on the same application profile 108.

Figure 8:
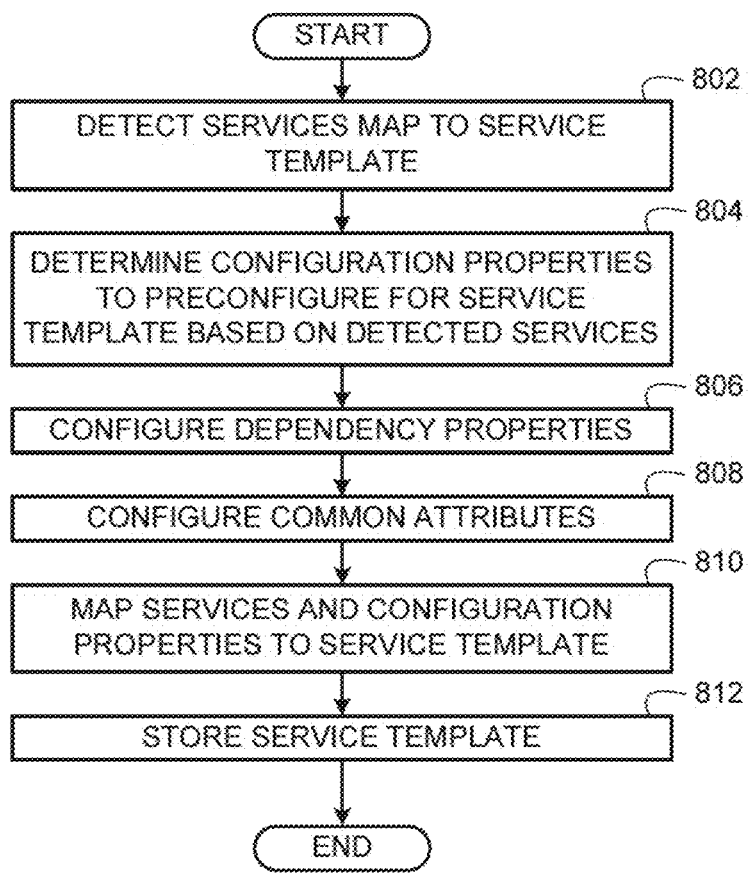
FIG. 8 is a flow diagram representative of example machine readable instructions that may be executed to implement the example blueprint editor of FIG. 1 to map services to service templates.
Figure 9:
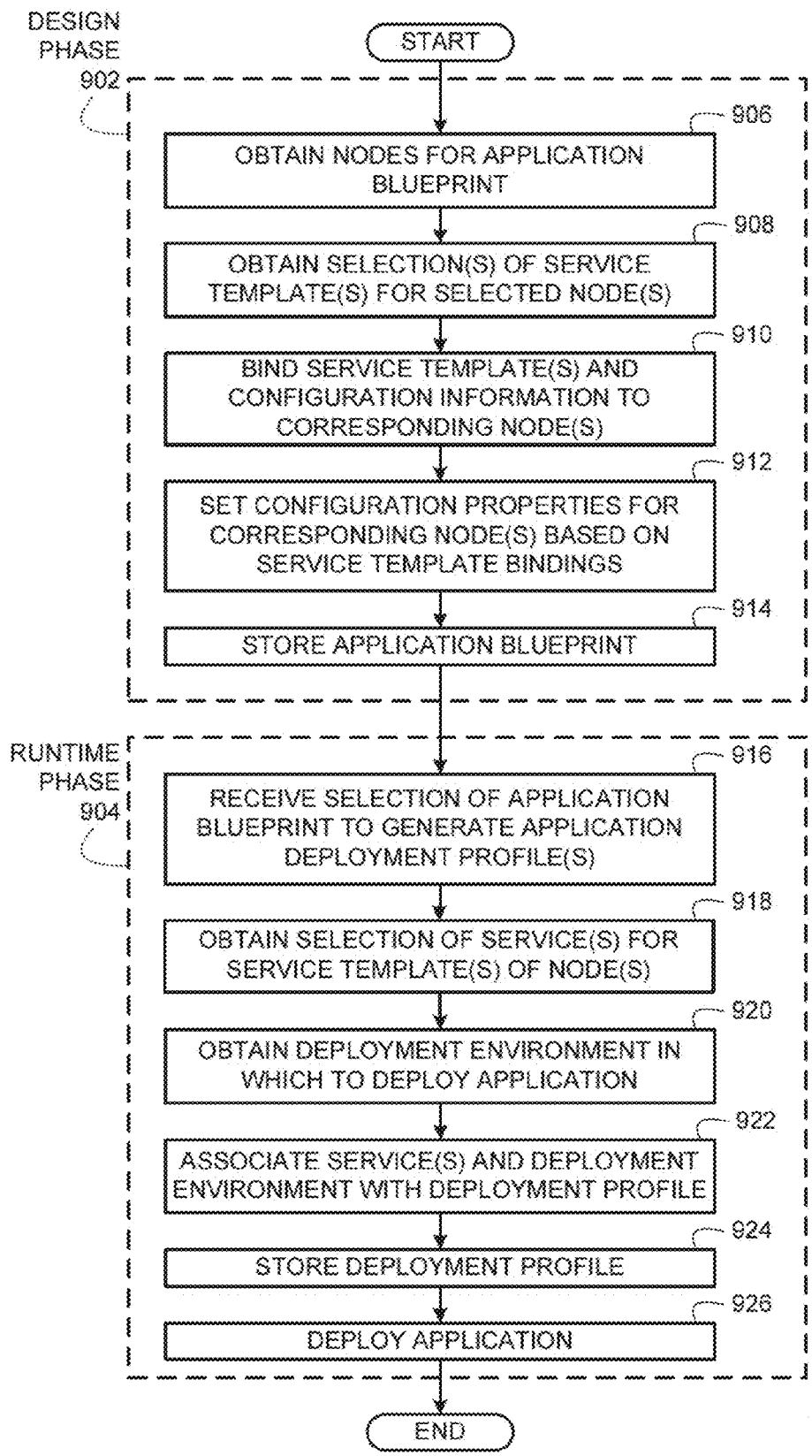
FIG. 9 is a flow diagram representative of example machine readable instructions that may be executed to implement the example application provisioning manager of FIG. 1 to design application blueprints based on service templates at a design phase and to select particular services for applications at a runtime phase when the applications are being deployed.

Flowcharts representative of example machine readable instructions for implementing the application provisioning manager 100 of FIG. 1 are shown in FIGS. 8 and 9. In these examples, the machine readable instructions comprise programs for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 8 and 9, many other methods of implementing the example application provisioning manager 100 may alternatively be used. For example, the order of execution of the blocks may be changed, and/or some of the blocks described may be changed, eliminated, or combined.

As mentioned above, the example processes of FIGS. 8 and 9 may be implemented using coded instructions (e.g., computer and/or machine readable instructions) stored on a tangible computer readable storage Medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8 and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase it least is used as the transition term in a preamble of a claim, it is open-ended in the same manner as the term "comprising" is open ended.

The example program of FIG. 8 may be executed to implement the example blueprint editor 102 of FIG. 1 to map example services 302 (FIG. 3) to example service templates 110 (FIGS. 1 and 3). The example program of FIG. 8 may be used by an administrator 124 (FIG. 1) to generate a catalog of numerous service templates 110 to be stored the service templates repository 112 (FIG. 1) so that developers (e.g., the developer 130 of FIG. 1) can have numerous options of service templates 110 from which is select to design application blueprints. The example program of FIG. 8 begins when the blueprint editor 102 detects ones of the services 302 selected to be mapped to a service template 110 (block 802). For example, the blueprint editor 102 may use the template mapping options GUI 300 of FIG. 3 to detect user selections of the Apache load balancer and the F5 load balancer services 302 for mapping to the example load balancer template 110a. The example blueprint editor 102 then determines configuration properties 111 (FIG. 1) to preconfigure for the service template 110a based on the detected services (block 804). For example, the blueprint editor 102 may analyze dependencies and attributes of the Apache load balancer and the F5 load balancer services 302 to determine which inter-node dependency properties to preconfigure and to determine what attributes the Apache load balancer and the F5 load balancer services 302 have in common (e.g., inter-node dependency properties and attributes that can be preconfigured with the same value(s) in the load balancer template 110a).

The example blueprint editor 102 configures dependency properties of the configuration properties 111 (block 806). In addition, the example blueprint editor 102 configures common attributes of the configuration properties 111 (block 808). For example, the blueprint editor 102 may use the template properties definitions GUI 400 of FIG. 4 to obtain values to configure the dependency properties and the common attributes as described above in connection with FIG. 4. The example blueprint editor 102 maps the services 302 and the configuration properties 111 to the service template 110 (block 810). For example, the blueprint editor 102 may associate the Apache load balancer and the F5 load balancer services 302 and the configuration properties 111 with the load balancer service template 110a by storing the Apache load balancer and F5 load balancer services 302 and the configuration properties 111 in association with or in a field of the load balancer service template 110a. The example blueprint editor 102 stores the service template 110 (block 812). For example, the blueprint editor 102 may store the service template 110 in the service templates repository 112 so that the service template 110 may be later selected by the developer 130 during a design phase to design an application blueprint (e.g., the application blueprint 108) based on the service templates 110 instead of particular services. The example program of FIG. 8 then ends.

The example program of FIG. 9 may be used to design application blueprints (e.g., the application blueprint 108 of FIG. 1) based on service templates (e.g., the service templates 110 of FIG. 1) at a design phase 902 (e.g., a development phase) and to select particular services (e.g., the services 702, 704, 706, 710, 712, 714 of FIG. 7) for applications (e.g., the applications 114, 116 of FIGS. 1 and 7) at runtime phase 904 when the applications are being deployed. The example program of FIG. 9 starts at the design phase 902 when the example blueprint editor 102 (FIG. 1) obtains nodes for an application blueprint (block 906). For example, the blueprint editor 102 may receive the nodes 502, 504, 506 (FIG. 5) (or any other nodes) selected by the developer 130 (FIG. 1) to design the application blueprint 108. The example blueprint editor 102 obtains one or more selection(s) of one or more service template(s) for one or more selected node(s) (block 908), For example, the blueprint editor 102 may receive selection(s) of one or more of the service template(s) 110a-c selected by the developer 130 via the service template panel 510 of FIG. 5. In some examples, the developer 130 may elect to bind service templates 110 to all of the nodes (e.g., the nodes 502, 504, 506 of FIG. 5) of the application blueprint 108. In other examples, the developer 130 may elect to bind a service template 110 to only one or less than all of the nodes (e.g., the nodes 502, 504, 506 of FIG. 5) of the application blueprint 108. In some examples, the developer 130 may elect to bind particular services to some of the nodes of the application blueprint 108 at the design phase 902. In any case, the blueprint editor 102 detects ones of the nodes that the developer 130 selects for binding to service templates 110 and does not bind service templates to nodes not, selected by the developer 130 for binding to a service template.

The example blueprint editor 102 hinds the one or more service template(s) 110 (obtained at block 908) and their corresponding configuration information 111 to one or more corresponding selected node(s) (block 910). For example, based on the selection(s) of the one or more service template(s) at block 908, the blueprint editor 102 obtains the configuration information 111 napped to the service template(s) 110 as described above in connection with the program of FIG. 8 and the template properties definitions GUI 400 of FIG. 4. The example blueprint editor 102 then binds the configuration information 111 and the service templates 110a-c to corresponding ones of the nodes 502, 504, 506 (block 912) as described above in connection with the service template binding GUI 500 of FIG. 5. The example blueprint editor 102 stores the application blueprint 108 in the blueprint repository 113 of FIG. 1 (block 914). In this manner, the application blueprint 108 designed during the design phase 902 can be subsequently used one or more times during the runtime phase 904 to select particular services and deploy one or more applications.

After the design phase 902, operations of blocks 916, 918, 920, 922, 924, 926 are performed during the runtime phase 904 to generate one or more deployment profiles 120 (FIG. 1) and to deploy one or more applications 114, 116 (FIG. 1). In some examples, the runtime phase 904 occurs immediately or shortly after the design phase 902. In other examples, the runtime phase 904 and the design phase 902 are separated by a longer duration. Initially during the runtime phase 904, the example deployment profile generator 104 (FIG. 1) receives a selection of an application blueprint to generate one or more application deployment profile(s) (block 916). For example, the deployment profile generator 104 may receive a user-selection of the application profile 108 stored in the blueprint repository 113 to generate, for example, one or both of the application deployment profiles 120a and 120b of FIG. 7. The example deployment profile generator 104 obtains selection(s) of one or more of the service(s) 302 for one or more of the corresponding service template(s) 110 of the node(s) of the application blueprint 108 (block 918). For example, the deployment profile generator 104 may receive the selection(s) of the one or more service(s) 302a-c via the deployment profile configuration GUI 600 of FIG. 6. In the illustrated example, the developer 130 selects the services 302a-c via the deployment profile configuration GUI 600 for corresponding ones of the service templates 110a-c so that the deployment profile generator 104 can bind the selected services 302a-c to corresponding nodes 502, 504, 506 (FIG. 5) associated with the service templates 110a-c.

In the illustrated example, the example deployment profile generator 104 obtains a deployment environment in which to deploy an application (block 920). For example, the deployment profile generator 104 may receive a user-selection from the developer 130 of one of the cloud environments 118a, 118b of FIG. 1. The example deployment profile generator 104 associates the one or more service(s) 302a-c and the deployment environment 118a, 118b with a deployment profile 120 (block 922). The example deployment profile generator 104 stores the deployment profile 120 in the deployment profile repository 122 (FIG. 1) (block 924). In this manner, the example application deployer 106 can subsequently retrieve the deployment profile 120 one or more times to deploy one or more instances of an application defined in the deployment profile 120. In the illustrated example, the application deployer 106 deploys the application defined in the deployment profile 120 (block 926). For example, the application deployer 106 uses the information stored in the deployment profile 120 to deploy, for example, the application A 114 in the cloud environment A 118a as shown in FIG. 1, or the application B 116 in the cloud environment B 118b as shown in FIG. 1. In the illustrated example, the deployment by the application deployer 106 involves the application deployer 106 communicating the configuration properties 111 to the VM 126, 128 in the target cloud environment 118a, 118b to configure the VM 126, 128 to host the application 114, 116. The example program of FIG. 9 then ends. Additionally or alternatively, the application deployer 106 may deploy an application based on the deployment profile 120 at a later time after storing the deployment profile 120 in the deployment profile repository 122.

Figure 10:
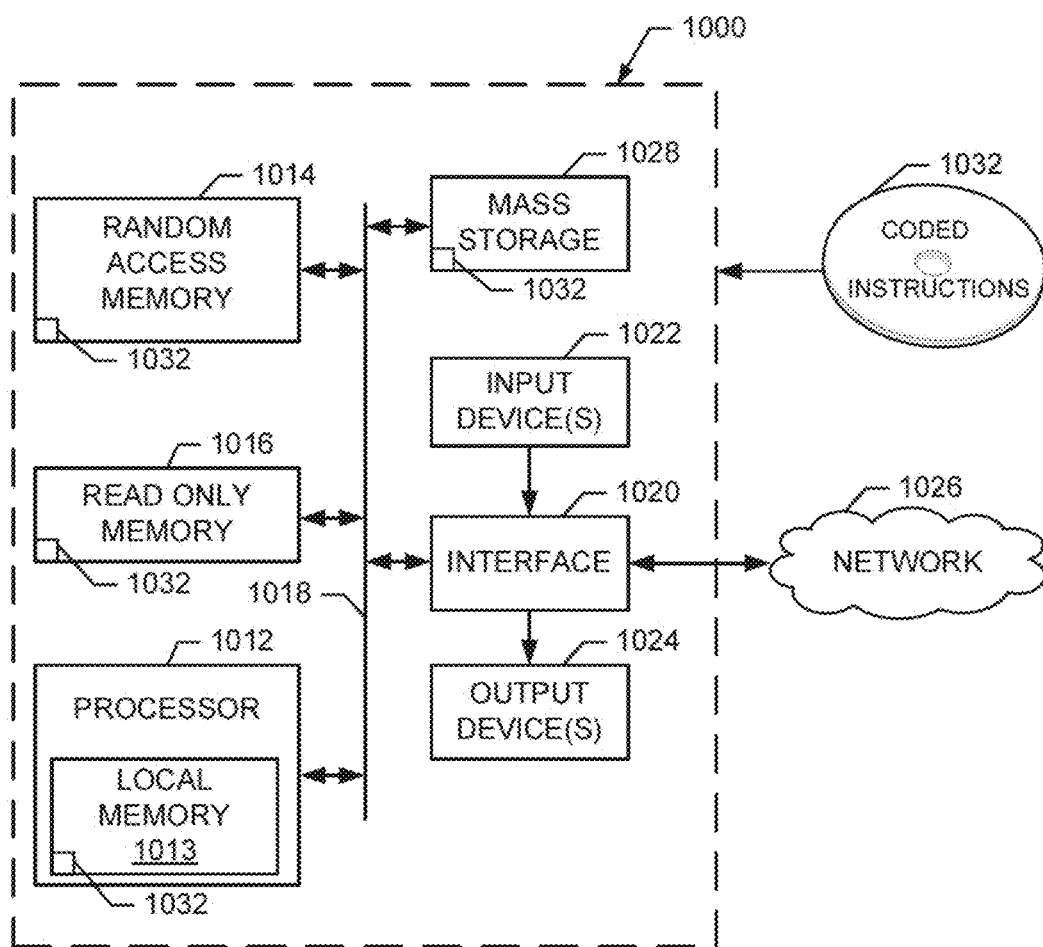
FIG. 10 is a block diagram of an example processor system that may be used to Implement the example application provisioning manager of FIG. 1.

FIG. 10 is a block diagram of an example processor platform 1000 capable of executing the instructions of FIGS. 8 and 9 to implement the example application provisioning manager 100 of FIG. 1. The processor platform 1000 can be, for example, a server, a personal computer, or any other type of suitable computing device. The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of Memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT) a touchscreen, a tactile output device, a light emitting diode (LED), a printer and/or speakers). The interface circuit 1020 of the illustrated example, thus, typically includes a graphics driver card a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives. RAID systems, and digital versatile disk (DVD) drives.

Example coded instructions 1032 of the illustrated example include the example machine readable instructions of FIGS. 8 and 9. The example coded instructions 1032 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture enable configuring application blueprints in a flexible manner based on service templates such that the application blueprints do not need to be fixedly bound to particular services at a design phase. As such, developers are provided with flexibility during a runtime phase to generate application deployment profiles based on selectability of numerous services during the runtime phase. In this manner, a developer can design and test an application blueprint during a development phase, and can use the same tested application blueprint during a runtime phase to deploy an application. Such use of a single blueprint for use during a development phase and a runtime phase provides numerous advantages. An example advantage is that a blueprint that is tested and approved in a development cloud environment can be used to deploy an application in a production cloud environment with assurances of how the blueprint will operate when deploying the application since it has been previously used and tested numerous times during development. Another example advantage is that developers do not have to develop, update, maintain, and test multiple separate blueprints for numerous applications that differ in the types of services bound to each application. Such updating and maintaining separate blueprints can be tedious, time consuming, and error prone because a developer must be certain that all aspects that are common to the blueprints are updated in the same manner across all blueprints. In addition, the developer must test all of the blueprints when any change is made to the common aspects. Using examples disclosed herein to develop blueprints using service: templates that allow binding different services to different aspects of an application at runtime allow a developer to develop, update, maintain, and test a single blueprint, thereby reducing time, resources, and possibilities of errors when developing, deploying, and maintaining applications.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to configure an application blueprint, the method comprising:
   during a design phase, generating an application blueprint that binds a service template to a node of an application to be deployed in a cloud environment, and wherein the service template is mapped to a plurality of services that are selectable during a runtime phase to implement the node in the cloud environment; and
   during the runtime phase:
      selecting one of the services that is mapped to the service template when the application is being, deployed in the cloud environment; and
      generating an application deployment profile to deploy the application using the one of the services selected to implement the node, wherein the generating of the application deployment profile includes:
      using the application blueprint during the runtime phase to:
         generate a first deployment profile to deploy a first application based on a first service selected based on the service template to implement the node; and
         generate a second deployment profile to deploy a second application based on a second service, different from the first service, based on the service template to implement the node.

2. A method as defined in claim 1, wherein the one of the services is mapped to the service template prior to the design phase, the mapping of the one of the services to the service template prior to the design phase being indicative of the one of the services being selectable during the runtime phase for binding to the node associated with the service template.

3. A method as defined in claim 1, further including associating configuration properties defined in the service template with the application deployment profile, the configuration properties including dependency properties to configure inter-node dependencies between the node and other nodes of the application blueprint.

4. A method as defined in claim 3, further including deploying the application in the cloud environment based on configuring a virtual machine to host the application using the configuration properties associated with the service template.

5. A method as defined in claim 1, further including storing the application blueprint during the design phase.

6. A method as defined in claim 1, wherein the service template is preconfigured prior to the design phase to include dependency properties defining inter-node dependencies between the node and other nodes.

7. A method as defined in claim 1, wherein the service template is preconfigured prior to the design phase to include values of properties that are configured to be the same for the plurality of the services that are selectable during the runtime phase to implement the node in the cloud environment.

8. An apparatus to configure an application blueprint, the apparatus comprising:
 a memory including machine readable instructions; and
 a processor to execute the instructions to at least:
  during a design phase, generate an application blueprint that binds a service template to a node of an application to be deployed in a cloud environment, and wherein the service template is mapped to a plurality of services that are selectable during a runtime phase to implement the node in the cloud environment;
  during the runtime phase:
   select one of the services that is mapped to the service template when the application is being deployed in the cloud environment; and
   generate an application deployment profile to deploy the application using the one of the services selected to implement the node, wherein the generating of the application deployment profile includes:
  using the application blueprint during the runtime phase to:
   generate a first deployment profile to deploy a first application based on a first service selected based on the service template to implement the node; and
   generate a second deployment profile to deploy a second application based on a second service, different from the first service, based on the service template to implement the node.

9. An apparatus as defined in claim 8, wherein the one of the services is mapped to the service template prior to the design phase, the mapping of the one of the services to the service template prior to the design phase being indicative of the one of the services being selectable during the runtime phase for binding to the node associated with the service template.

10. An apparatus as defined in claim 8, wherein the instructions further cause the processor to associate configuration properties defined in the service template with the application deployment profile, the configuration properties including dependency properties to configure inter-node dependencies between the node and other nodes of the application blueprint.

11. An apparatus as defined in claim 10, wherein the instructions further cause the processor to deploy the application in the cloud environment based on configuring a virtual machine to host the application using the configuration properties associated with the service template.

12. An apparatus as defined in claim 8, wherein the instructions further cause the processor to store the application blueprint during the design phase.

13. An apparatus as defined in claim 8, wherein the service template is preconfigured prior to the design phase to include dependency properties defining inter-node dependencies between the node and other nodes.

14. An apparatus as defined in claim 8, wherein the service template is preconfigured prior to the design phase to include values of properties that are configured to be the same for the plurality of the services that are selectable during the runtime phase to implement the node in the cloud environment.

15. A non-transitory computer readable storage medium comprising instructions that, when executed, cause a processor to at least:
 during a design phase, generate an application blueprint that binds a service template to a node of an application to be deployed in a cloud environment, and wherein the service template is mapped to a plurality of services that are selectable during a runtime phase to implement the node in the cloud environment; and
 during the runtime phase:
  selecting a first one of the services that is mapped to the service template when the application is being, deployed in the cloud environment; and
  generate an application deployment profile to deploy the application using the first one of the services selected to implement the node, wherein the generating of the application deployment profile includes:
 using the application blueprint during the runtime phase to:
  generate a first deployment profile to deploy a first application based on a first service selected based on the service template to implement the node; and
  generate a second deployment profile to deploy a second application based on a second service, different from the first service, based on the service tem plate to implement the node.

16. A non-transitory computer readable storage medium as defined in claim 15, wherein the one of the services is mapped to the service template prior to the design phase, the mapping of the one of the services to the service template prior to the design phase being indicative of the one of the services being selectable during the runtime phase for binding to the node associated with the service template.

17. A non-transitory computer readable storage medium as defined in claim 15, wherein the instructions further cause the processor to associate configuration properties defined in the service template with the application deployment profile, the configuration properties including dependency properties to configure inter-node dependencies between the node and other nodes of the application blueprint.

18. A non-transitory computer readable storage medium as defined in claim 17, wherein the instructions further cause the processor to deploy the application in the cloud environment based on configuring a virtual machine to host the application using the configuration properties associated with the service template.

19. A non-transitory computer readable storage medium as defined in claim 15, wherein the instructions further cause the processor to store the application blueprint during the design phase.

20. A non-transitory computer readable storage medium as defined in claim 15, wherein the service template is preconfigured prior to the design phase to include dependency properties defining inter-node dependencies between the node and other nodes.

21. A non-transitory computer readable storage medium as defined in claim 15, wherein the service template is preconfigured prior to the design phase to include values of properties that are configured to be the same for the plurality of the services that are selectable during the runtime phase to implement the node in the cloud environment.

* * * * *